US012639213B2

(12) United States Patent
Adams et al.

(10) Patent No.: US 12,639,213 B2
(45) Date of Patent: May 26, 2026

(54) PROCESSOR-DEPENDENT ADDRESS TRANSLATION FOR HOST MEMORY BUFFER

(71) Applicant: Nanjing Tenafe Electronic Technology Co., Ltd., Nanjing City (CN)

(72) Inventors: Lyle E. Adams, San Jose, CA (US); Chen Xiu, Beijing (CN)

(73) Assignee: Nanjing Tenafe Electronic Technology Co., Ltd. (CN)

( * ) Notice: Subject to any disclaimer, the term of this patent is extended or adjusted under 35 U.S.C. 154(b) by 0 days.

(21) Appl. No.: 18/868,538

(22) PCT Filed: Jul. 20, 2023

(86) PCT No.: PCT/CN2023/108276
§ 371 (c)(1),
(2) Date: Nov. 22, 2024

(87) PCT Pub. No.: WO2024/022205
PCT Pub. Date: Feb. 1, 2024

(65) Prior Publication Data
US 2025/0328463 A1 Oct. 23, 2025

Related U.S. Application Data

(60) Provisional application No. 63/393,461, filed on Jul. 29, 2022.

(51) Int. Cl.
*G06F 12/02* (2006.01)

(52) U.S. Cl.
CPC .. *G06F 12/0246* (2013.01); *G06F 2212/7201* (2013.01); *G06F 2212/7203* (2013.01)

(58) Field of Classification Search
CPC ............ G06F 12/0246; G06F 12/0292; G06F 12/084; G06F 12/0873; G06F 2212/214;
(Continued)

(56) References Cited

U.S. PATENT DOCUMENTS

| | | | |
|---|---|---|---|
| 11,403,011 B1 * | 8/2022 | Gunda | .................. G06F 3/0679 |
| 2018/0018095 A1 * | 1/2018 | Lee | ..................... G06F 12/1009 |

(Continued)

FOREIGN PATENT DOCUMENTS

| | | |
|---|---|---|
| CN | 108139902 | 6/2018 |
| CN | 112416819 | 2/2021 |

*Primary Examiner* — Jane W Benner
(74) *Attorney, Agent, or Firm* — Van Pelt, Yi & James LLP

(57) ABSTRACT

A module identifier and a request address associated with an access request are received at a host memory buffer (HMB) access module in a solid-state drive (SSD) system. A translated address is determined based at least in part on the module identifier and the request address, including by accessing at least one translation table that stores address mappings between (1) a plurality of processors in the SSD system and (2) a host memory buffer; each processor in the plurality of processors has a non-overlapping memory space in the host memory buffer. The access request is performed at a host interface, including by accessing the host memory buffer using the translated address, wherein the host memory buffer is located in host memory that is external to the SSD system.

15 Claims, 7 Drawing Sheets

(58) Field of Classification Search
CPC ......... G06F 2212/262; G06F 2212/311; G06F 2212/7201; G06F 2212/7203; G06F 3/061; G06F 3/0656; G06F 3/0659; G06F 3/0679; G06F 9/5016; G06F 9/544
See application file for complete search history.

(56) References Cited

U.S. PATENT DOCUMENTS

| | | | |
|---|---|---|---|
| 2019/0163396 A1* | 5/2019 | Jo | ........................... G06F 3/061 |
| 2021/0073404 A1* | 3/2021 | Sakata | ................. G06F 3/0623 |
| 2021/0096778 A1 | 4/2021 | Nagarajan | |

* cited by examiner

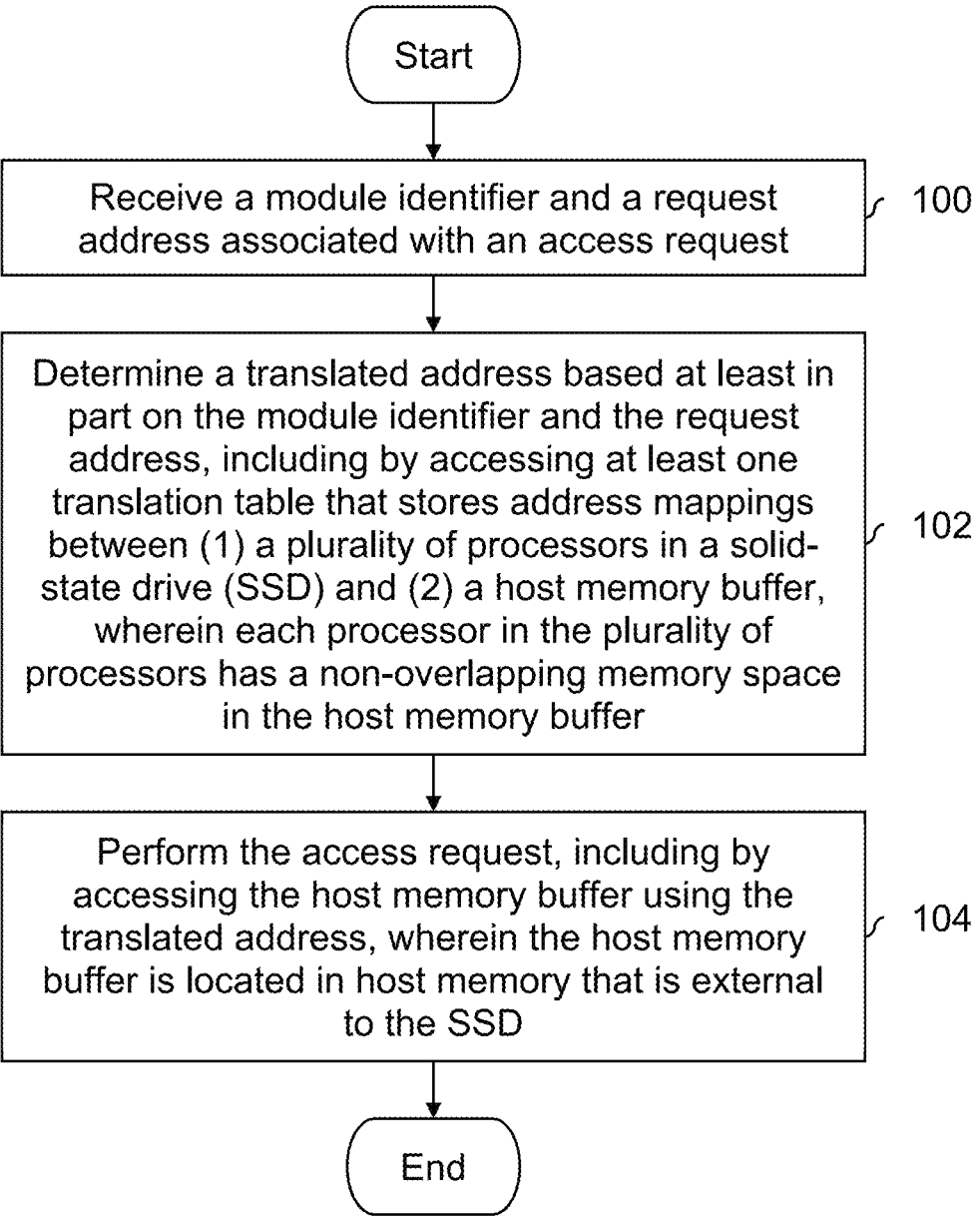

Start

Receive a module identifier and a request address associated with an access request    ⌐ 100

Determine a translated address based at least in part on the module identifier and the request address, including by accessing at least one translation table that stores address mappings between (1) a plurality of processors in a solid-state drive (SSD) and (2) a host memory buffer, wherein each processor in the plurality of processors has a non-overlapping memory space in the host memory buffer    ⌐ 102

Perform the access request, including by accessing the host memory buffer using the translated address, wherein the host memory buffer is located in host memory that is external to the SSD    ⌐ 104

End

FIG. 1

Access Request (Including Module Identifier and Request Address) (410)

400 — HMB Access Module

402 — Translation Table(s)

404 — Translation Controller

406 — Translation Settings

Access Response (416)

411a — Host I/F

Host Request Including Translated Address (412)

408 — Host

Host Response (414)

411b — Host I/F

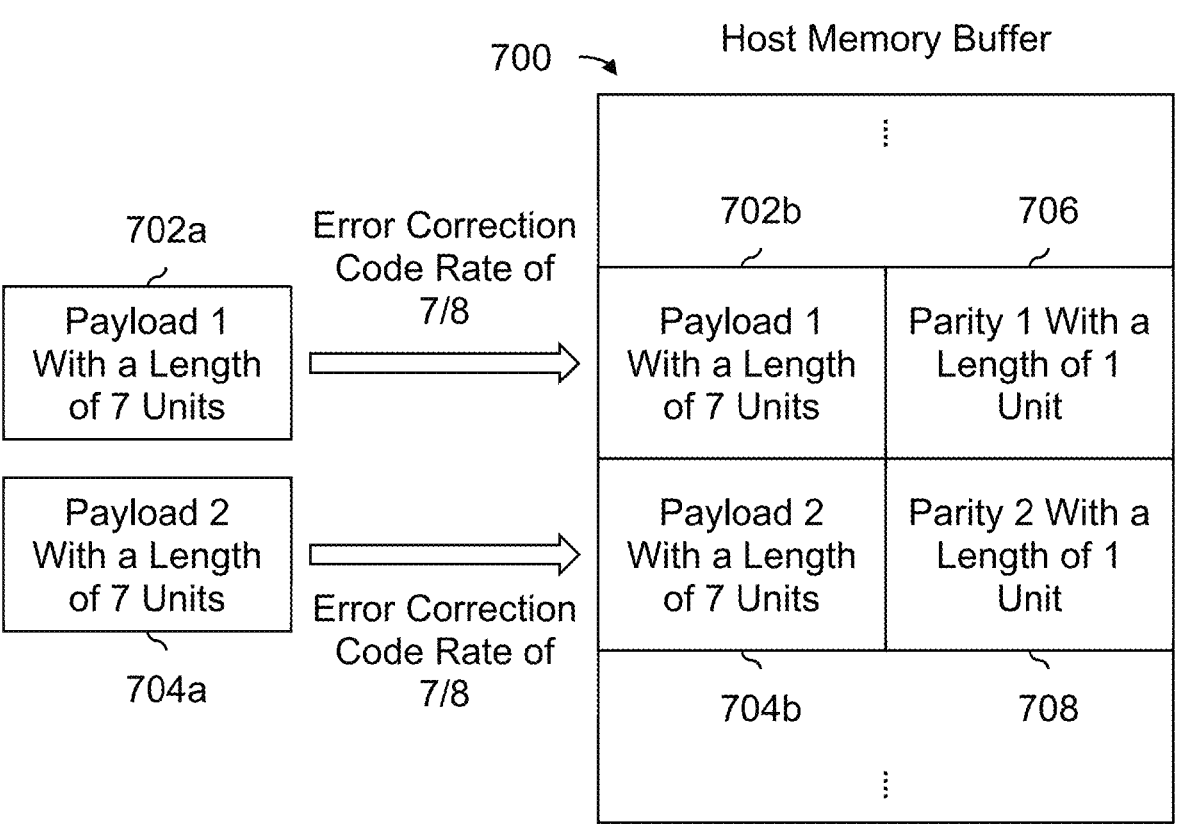
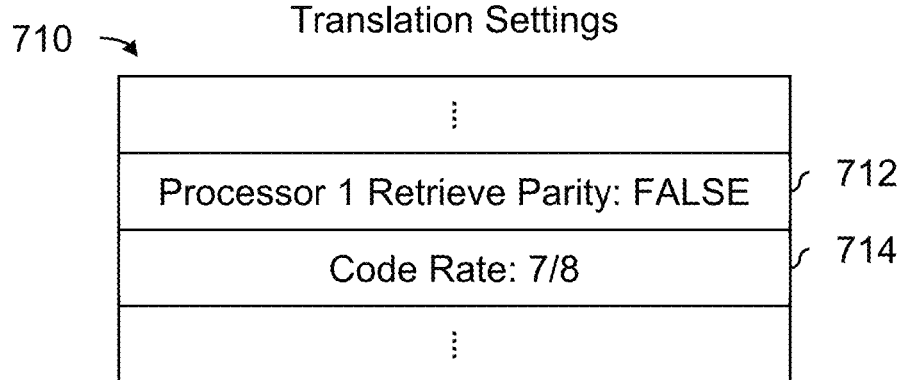
FIG. 7

PROCESSOR-DEPENDENT ADDRESS TRANSLATION FOR HOST MEMORY BUFFER

CROSS REFERENCE TO OTHER APPLICATIONS

This application claims priority to International (PCT) Application No. PCT/CN23/108276, entitled PROCESSOR-DEPENDENT ADDRESS TRANSLATION FOR HOST MEMORY BUFFER filed Jul. 20, 2023, which claims priority to U.S. Provisional Patent Application No. 63/393,461 entitled PROCESSOR-DEPENDENT ADDRESS TRANSLATION FOR HOST MEMORY BUFFER filed Jul. 29, 2022, each of which is incorporated herein by reference for all purposes.

BACKGROUND OF THE INVENTION

A Solid-State Drive (SSD) system includes an SSD controller (e.g., implemented on a System On Chip (SOC)) and solid-state storage media (e.g., NAND Flash storage media). New techniques which improve the performance and/or reduce the cost of an SSD system would be desirable. For example, such a new SSD system may be able to provide the same level of performance using less expensive components.

BRIEF DESCRIPTION OF THE DRAWINGS

Various embodiments of the invention are disclosed in the following detailed description and the accompanying drawings.

FIG. 1 is a flowchart illustrating an embodiment of a process to perform an access request that is directed to a host memory buffer, including by performing address mapping.

FIG. 7 is a diagram illustrating an embodiment of error correction encoded data in a host memory buffer and associated translation settings.

DETAILED DESCRIPTION

Figure 2:
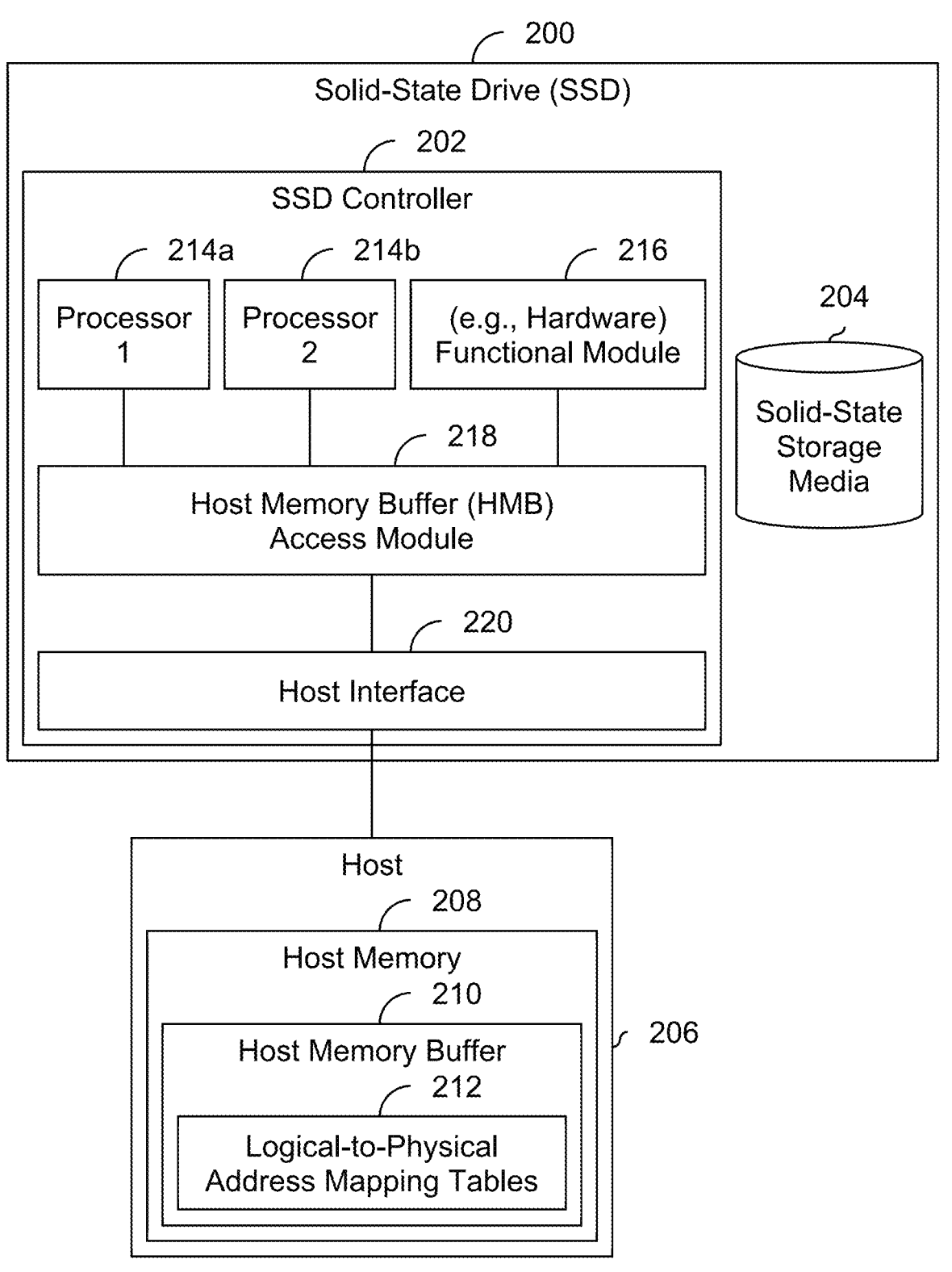
FIG. 2 is a diagram illustrating an embodiment of a solid-state drive (SSD) with a host memory buffer (HMB) access module which provides access to a host memory buffer for two processors and a functional module.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques and/or systems which perform and/or manage address translation between a host memory buffer and multiple processors (e.g., which store data in the host memory buffer) are described herein. In one example application, a solid-state drive (SSD) controller is implemented using a System On Chip (SOC) with multiple processors running firmware (e.g., identical firmware images or different firmware images). Those processors may store information in a host memory buffer and a host memory buffer (HMB) access module provides read and write access to the host memory buffer for those processors (and in some embodiments, additional (e.g., functional) modules in the SSD controller). Module identifiers are used to perform the address mapping and (as will be described in more detail below) at least some HMB access module embodiments support and/or enforce non-overlapping memory spaces within the host memory buffer, as well as fragmented memory allocation or assignments within the host memory buffer for a given processor or functional module (e.g., because a host will often grant or otherwise allocate fragmented memory space(s) within a host memory buffer).

The following figure shows an example of a process to perform an access request that is directed to a host memory buffer, including by performing an address mapping.

FIG. 1 is a flowchart illustrating an embodiment of a process to perform an access request that is directed to a host memory buffer, including by performing address mapping. In some embodiments, the process of FIG. 1 is performed by an HMB access module in an SSD controller.

At 100, a module identifier and a request address associated with an access request are received. For example, multiple processors (e.g., in an SOC where firmware is running on each of the processors) may store data in a host memory buffer, and the access request may be associated with a read from or write to the host memory buffer. Each module (e.g., one of the processors or a functional module) that stores data in a host memory buffer has a (e.g., unique) module identifier that is provided at step 100.

The request address that is received at step 100 is a local and/or perceived address (e.g., relative to or within the context of how memory space is perceived by the requesting processor or functional module). For example, a (requesting)

processor or functional module may think that it has or is working with a contiguous memory space, but the actual allocated or assigned memory space on the host memory buffer may be fragmented into multiple fragments of varying size.

In one example of step 100, a (requesting) processor wants to perform a write to the host memory buffer; to do so, the requesting processor sends its module identifier (i.e., associated with that processor) and the requested (e.g., write) address to an HMB access module.

At 102, a translated address is determined based at least in part on the module identifier and the request address, including by accessing at least one translation table that stores address mappings between (1) a plurality of processors in a solid-state drive (SSD) and (2) a host memory buffer, wherein each processor in the plurality of processors has a non-overlapping memory space in the host memory buffer.

For example, to ensure that one processor does not overwrite the data being stored in the host memory buffer by another processor, each processor has non-overlapping memory space(s) in the host memory buffer. Each module which stores data in the host memory buffer has its own mapping between its local and/or request addresses and corresponding and/or translated addresses in the host memory buffer. In one conceptually simple example, each module that stores data in the host memory buffer has its own translation table, so in some embodiments, step 102 includes selecting the translation table that corresponds to the module identifier and then looking up the request address in the selected translation table to obtain the translated address.

At 104, the access request is performed, including by accessing the host memory buffer using the translated address, wherein the host memory buffer is located in host memory that is external to the SSD. For example, there may be some interface via which an SSD device (which includes the SSD controller and solid-state storage media) communicates with the host, and the access request (e.g., including the translated address) is exchanged via such as a host-SSD device interface. In some embodiments, the access request is a read request, and step 104 includes an HMB access module returning the read data (e.g., that is read from the translated address in the host memory buffer) to the requesting module.

Although some other SSD systems store address mapping information in host memory, those other systems do not support SSD systems with multiple processors (or, more generally, multiple modules which store information in the host buffer), where each processor (module) has non-overlapping memory space in the host memory buffer.

It may be helpful to show an example system which performs the process of FIG. 1. The following figure shows one such example where an SSD includes an HMB access module and modules in the SSD controller access their data in the host memory buffer via the HMB access module.

FIG. 2 is a diagram illustrating an embodiment of a solid-state drive (SSD) with a host memory buffer (HMB) access module which provides access to a host memory buffer for two processors and a functional module. In this example, a solid-state drive (SSD) (200) includes an SSD controller (202) and solid-state storage media (204). The SSD controller (202) reads data from and writes data to the solid-state storage media (204), as directed by the host (206).

When the host (206) sends read or write instructions to the SSD controller (202) to read from or write to the solid-state storage media (204), the host uses logical addresses. On the solid-state storage media (204), the data (which may be divided up, interleaved, and error correction encoded before being stored on the solid-state storage media (204)) is stored in physical addresses. The SSD controller (202) must track this logical-to-physical address mapping and for simplicity and ease of explanation, this mapping or translation information is referred to in this example as "logical-to-physical address mapping tables."

Historically, logical-to-physical address mapping tables were stored (e.g., locally) in memory on the SSD (200). However, the host memory (208), which is located in the host (206), offers less expensive memory compared to memory (not shown) in the SSD (200). To take advantage of the less-expensive host memory (208), the logical-to-physical address mapping tables (212) are stored in host memory (208), specifically, the host memory buffer (210).

In some embodiments, the host memory (208) contains instructions (e.g., programs) and data used by the host processor(s) and may contain data used by devices within the system (e.g., an SSD) or connected to a host system (e.g., network-attached devices). The host memory buffer (in at least some embodiments) is used in cooperation with a host operating system and is generally requested by a device driver for use by an associated device. Some (e.g., other) host memory buffers may be used by both the device and the host, such as graphics buffers, which may be written by host software and read (e.g., for display) by the graphics adapter device. Generally, the (SSD) host memory buffer (e.g., 208) is allocated by the device driver, but is used exclusively by the SSD (200).

In this example, the SSD controller (202) includes three modules which need to access the logical-to-physical mapping tables (212) and/or other information of theirs in the host memory (208): Processor 1 (214a), Processor 2 (214b), and a (e.g., hardware) functional module (216) (e.g., a module built or otherwise designed for specific function(s) and/or service(s)). For example, the three exemplary modules (214a, 214b, and 216) may need to respond to and/or support an instruction from the host (206) to access the solid-state storage media (204) which requires access to the logical-to-physical address mapping tables (212) which are stored in the host memory buffer (210).

In some embodiments, the processors (214a and 214b) are symmetric multiprocessing (SMP) processors that run the same and/or identical firmware. An SMP implementation may be desirable in some applications because it more easily scales up or down by changing the number of processors in the SSD controller System On Chip (SOC). In at least some embodiments, the HMB access module (218) supports and/or enforces non-overlapping memory usage within the host memory buffer (210) so that if Processor 1 (214a) were an SMP processor, it would use one set of memory locations in the host memory buffer (210) that does not overlap with the set of memory locations used by Processor 2 (214b), which in this example is also an SMP processor. For example, it would be undesirable to create a data coherency problem if Processor 1 (214a) were to write to the memory location in the host memory buffer (210) used by Processor 2 (214b) and overwrite Processor 2's data. The rule and/or property about non-overlapping memory spaces applies regardless of the number of (e.g., SMP) processors. To ensure data coherency, this rule also applies to the functional module (216) (e.g., so the functional module (216) does not overwrite one of the processor's data in the host memory buffer (210), or vice versa). It is noted that the techniques described herein are not necessarily limited to SMP processors (i.e., the techniques work even if the processors run different firmware images).

In some embodiments, the functional module (216) is a direct memory access (DMA) module that allows or otherwise supports access to the host memory (208), such as the host memory buffer (210), independent of (e.g., without requiring guidance and/or processing resources from) the processors (214a and 214b). For example, a DMA module may be programmed and/or configured by the processors (e.g., 214a and/or 214b) to act as a proxy for the firmware (e.g., running on processors (214a and/or 214b)). Once configured, the DMA module can provide memory access services to other (hardware) functional modules (not shown) in the SSD controller (202) without requiring resources, intervention, and/or guidance from firmware and/or the processors (214a and 214b). Since a DMA module (or other functional modules) may store information in the host memory buffer (210) and/or host memory (208), the HMB access module (218) provides address translation and/or memory access services to a functional module (216), such as a DMA module, in addition to providing those services to the processors (214a and 214b).

Returning briefly to FIG. 1, the HMB access module (218) is one example of a system or device that performs the process of FIG. 1. For example, the module identifier and request address (e.g., received at step 100 in FIG. 1) may be received from Processor 1 (214a in FIG. 2), Processor 2 (214b in FIG. 2), or the functional module (216 in FIG. 2). The HMB access module (218 in FIG. 2) then determines the translated address (see, e.g., step 102 in FIG. 1) and the host interface (220) performs the access request (see, e.g., step 104 in FIG. 1), including by accessing the host memory buffer (210 in FIG. 2) using the translated address. In some embodiments, the SSD controller (202 in FIG. 2) is a System On Chip (SOC) and the HMB access module (218 in FIG. 2) is a hardware functional module on the SOC.

It is noted that the storing of logical-to-physical mapping tables (212) in the host memory buffer (210) and/or the need to access such mapping tables is merely exemplary and is not intended to be limiting. To put it another way, the HMB access module (218) may be used to access any type of information stored in the host memory (208) and/or host memory buffer (210).

Similarly, the number of modules and combination of module types shown here (i.e., two processors (214a and 214b) and one functional module (216)) are merely exemplary and are not intended to be limiting. Any number and/or combination of modules may store data in a host memory (208) and thus interface with the HMB access module (218) for access to that module's data in host memory (208).

The following figure shows an example of address mapping between the exemplary modules in the SSD controller (i.e., processors (214a and 214b) and functional module (216)) and host memory buffer (210).

Figure 3:
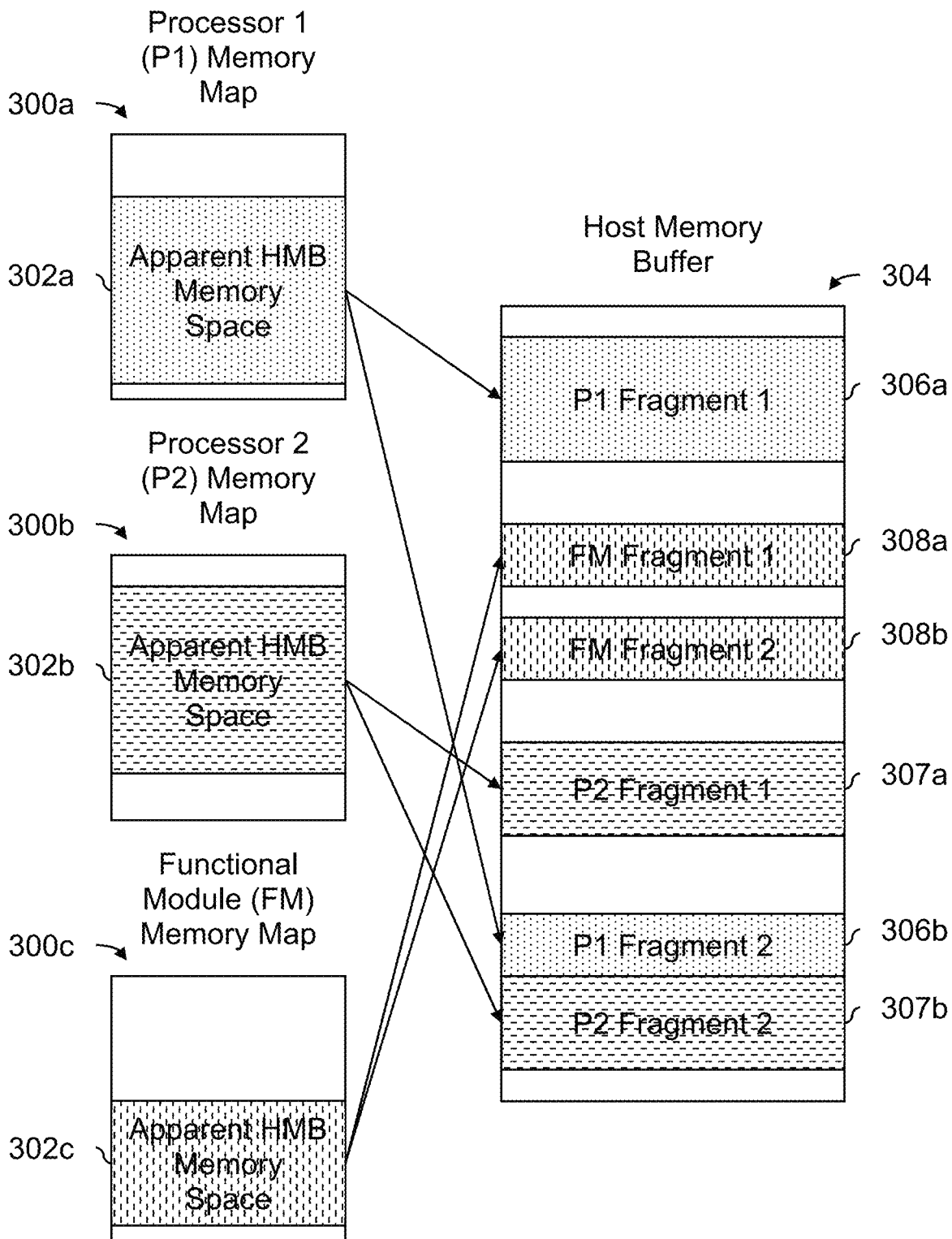
FIG. 3 is a diagram illustrating an embodiment of address mappings between three modules in an SSD controller and a host memory buffer.

FIG. 3 is a diagram illustrating an embodiment of address mappings between three modules in an SSD controller and a host memory buffer. This example continues the previous example of FIG. 2 where Processors 1 and 2 (214a and 214b) and a functional module (216) store data in a host memory buffer (210). In this example, Processor 1 (P1) has a memory map (300a) which includes an apparent (e.g., from the point of view of and/or as perceived by Processor 1) HMB memory space (302a). As shown in this example, the apparent HMB memory space (302a) is a contiguous memory space. Within the (e.g., actual) host memory buffer (304), however, the apparent HMB memory space (302a)

associated with Processor 1 is divided or otherwise fragmented into two non-contiguous fragments: P1 Fragment 1 (306a) and P1 Fragment 2 (306b).

Similarly, the apparent HMB memory space (302b) within the Processor 2 (P2) memory map (300b) is a single, contiguous space but is fragmented within the host memory buffer (see, e.g., P2 Fragment 1 (307a) and P2 Fragment 2 (307b)) and the apparent HMB memory space (302c) within the functional module (FM) memory map (300c) is a single, contiguous space but is fragmented within the host memory buffer (see, e.g., FM Fragment 1 (308a) and FM Fragment 2 (308b)). The number and sizes of the fragments (306a/b-308a/b) and apparent HMB memory spaces (302a-302c) shown here are merely exemplary and any number and/or sizes may be used. In some embodiments, for design simplicity and/or to keep the size of the HMB access module to a manageable size, there are some limits (e.g., maximums) on the number and/or size of the fragments in the host memory buffer.

As is shown in this example, in some embodiments, a contiguous apparent HMB memory space (e.g., 302a) associated with a given one of the plurality of processors (e.g., Processor 1) corresponds to a plurality of non-contiguous fragments (e.g., 306a and 306b) in the host memory buffer (e.g., 304).

The following figure shows an example block diagram of an HMB access module

Figure 4:
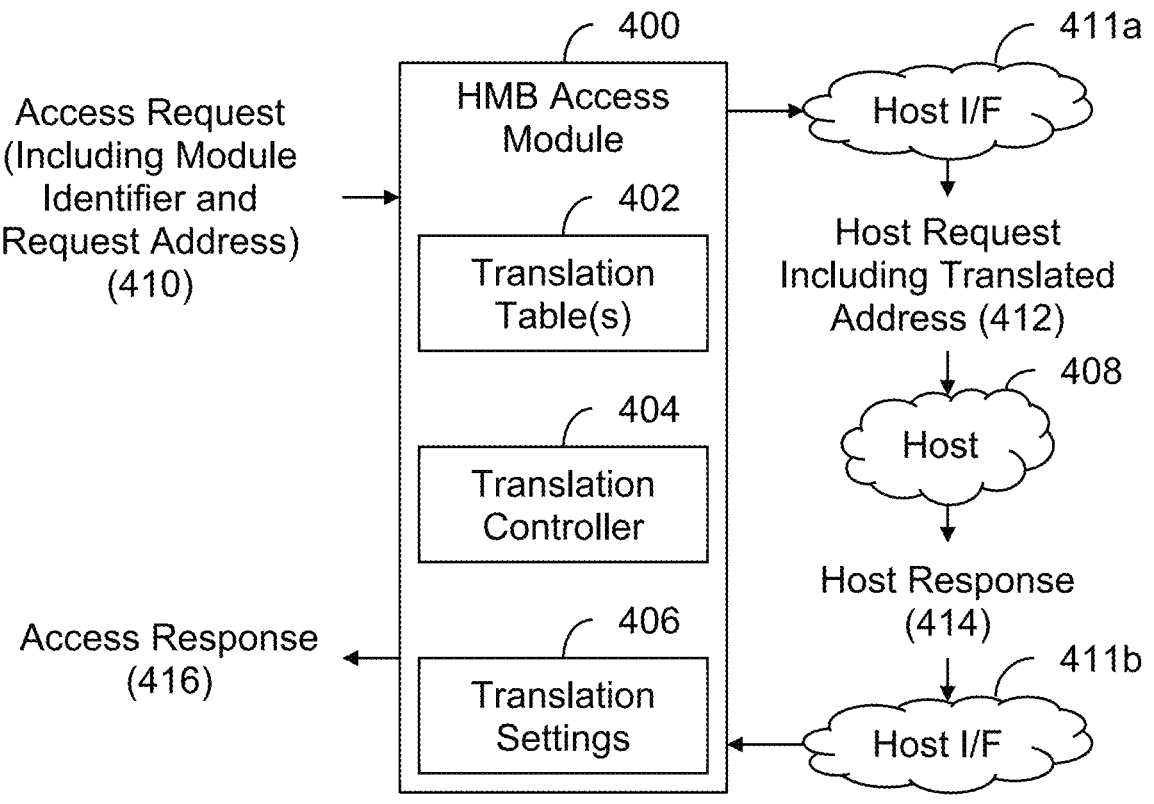
FIG. 4 is a diagram illustrating an embodiment of a host memory buffer (HMB) access module.

FIG. 4 is a diagram illustrating an embodiment of a host memory buffer (HMB) access module. In some embodiments, HMB access module (218) in FIG. 2 is implemented as shown here. In this example, an HMB access module (400) receives an access request (410) which includes a module identifier and a request address. For example, if the access request is a write request, then the write request will also include write data (e.g., to be written in the host memory buffer).

In the HMB access module (400), the translation controller (404) accesses the one or more translation table(s) (402) and uses the module identifier and request address to determine the translated access. In one straightforward example, the translation table(s) (402) have a separate table for each module identifier, and the appropriate translation table is selected based on the module identifier. The entry in the selected translation table that has the request address is then identified and accessed to obtain the (e.g., corresponding) translated address.

In some embodiments, the translation table(s) (402) comprise a single table where entries corresponding to different module identifiers share space within the (e.g., only) translation table and entries are added as they are created and/or arrive. Sharing a single translation table amongst all of the processors and/or modules may reduce the amount of translation logic in the HMB access module, which may be desirable in some applications. In some such embodiments (i.e., where there is a single translation table), each entry may include the module identifier that corresponds to a given entry.

The HMB access module (400) also includes translation settings (406) which (at least in some embodiments) affect how the translation controller (404) performs the translation and/or performs the host request (412). For example, as will be described in more detail below, in some embodiments, any data that is stored in the host (408) is interleaved and error correction encoded, where the error correction encoding adds parity information to the stored data so the encoded data that is stored on the host (408) is larger than the (e.g., original) payload. In some embodiments, the translation settings (406) control whether just the payload and/or original data is returned in response to a read request (e.g., without the parity information), or if the parity information is returned with the payload and/or original data. For example, this may depend upon whether the requesting processor or requesting module has access to error correction decoding capabilities and/or if previously returned read data contained (or is suspected to contain) an error.

The translation controller (404) outputs the translated address to the host interface (I/F) (411a) which generates a host request (412) that includes the translated address. If the host request is associated with a write request, then the host request (412) may also include the write data. In this example, any interleaving and error correction encoding is handled by some module other than the HMB access module (400), so the HMB access module (400) does not need to perform error correction encoding.

The host (408) receives the host request (412) and returns a host response (414) to the HMB access module (400) via the host I/F (411b). In response to receiving the host response (414), the HMB access module (400) generates an access response (416) and sends it to the requesting processor (not shown) or requesting module (not shown). For example, if a read is being performed, then the host response (414) and access response (416) may include read data (e.g., that is read from the host buffer module). If a write is being performed, then the host response (414) may include a (write) translated address and that information is stored in the translation table(s) (402).

The following figure shows some translation examples from a request address (e.g., included in access request (410)) to a translated address (e.g., included in host request (412)).

Figure 5:
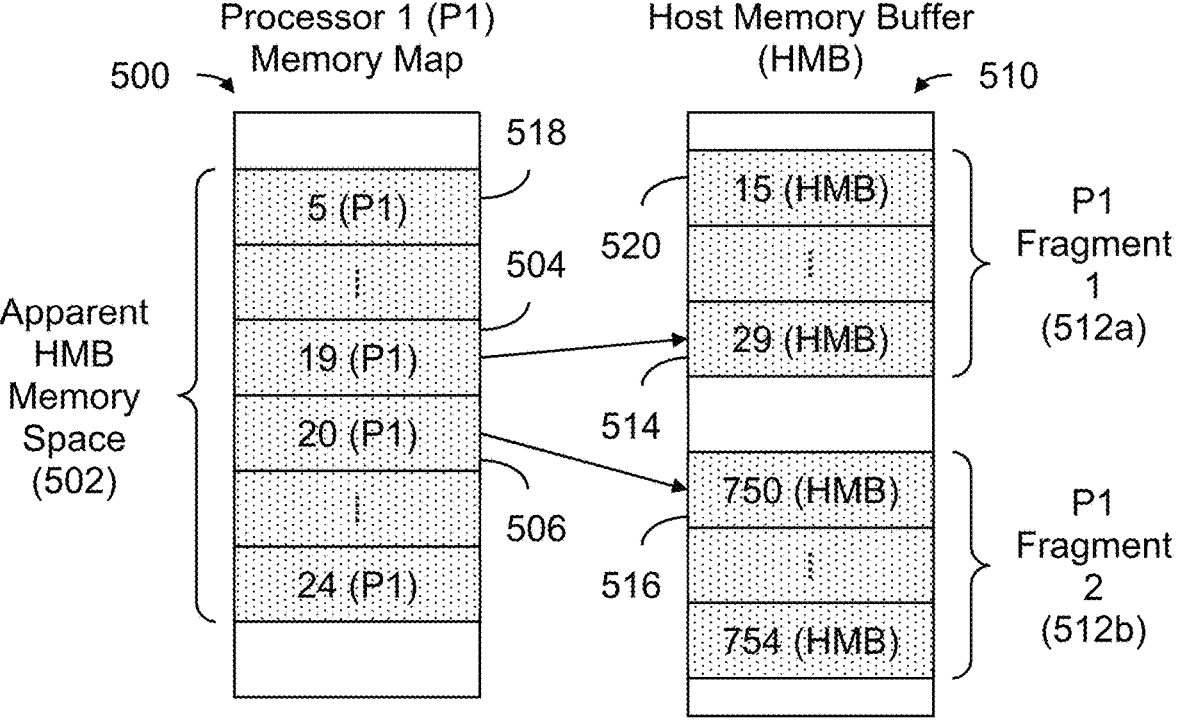
FIG. 5 is a diagram illustrating an embodiment of a translation from a request address to a translated address.

FIG. 5 is a diagram illustrating an embodiment of a translation from a request address to a translated address. In this example, the Processor 1 (P1) memory map (500) includes an apparent HMB memory space (502) with 20 addresses, ranging from 5 (P1) to 24 (P1). To indicate that the context or frame of reference for these addresses is Processor 1 (P1), these addresses are appended with "(P1)."

In the host memory buffer (510), the apparent HMB memory space (502) corresponds to P1 Fragment 1 (512a) and P1 Fragment 2 (512b). P1 Fragment 1 (512a) includes 15 addresses: 15 (HMB) through 29 (HMB); P1 Fragment 2 (512b) includes 5 addresses: 750 (HMB) through 754 (HMB). To indicate that the context or frame of reference for these addresses is the host memory buffer (HMB), these addresses are appended with "(HMB)."

In a first example, suppose that the request address is 19 (P1) (504). In this example, the following equation is used to calculate the translated address of 29 (HMB) (514) from the request address of 19 (P1) (504):

$$\text{Translated Address} = \text{Requested Address} -$$
$$\text{Request Region Base Address} + \text{Remap Base Address}$$

where the request region base address is the starting address of the region in the request address space, and the remap base address is the starting address in the translated address space.

Therefore, for a request address of 19 (P1) (504), the translated address would be calculated as:

$$\text{Translated Address} = 19 \ (P1) - 5 \ (P1) + 15 \ (HMB)$$
$$= 29 \ (HMB)$$

where address 5 (P1) (518) is the Request Region Base Address for P1 Fragment 1 (512a) and 15 (HMB) (520) is the Remap Base Address for P1 Fragment 1 (512a) in the above equation.

In a second example, suppose that the request address is 20 (P1) (506). In this example, the following equation is used to calculate the translated address of 750 (HMB) (516) from the request address of 20 (P1) (506):

$$\text{Translated Address} = 20 \ (P1) - 20 \ (P1) + 750 \ (HMB)$$
$$= 750 \ (HMB)$$

where address 20 (P1) (506) is the Request Region Base Address for P1 Fragment 2 (512b) and 750 (HMB) (516) is the Remap Base Address for P1 Fragment 2 (512b) in the above equation.

The following figure shows an example of an HMB access module that selects the proper request region base address and proper remap base address to calculate a translated address.

Figure 6:
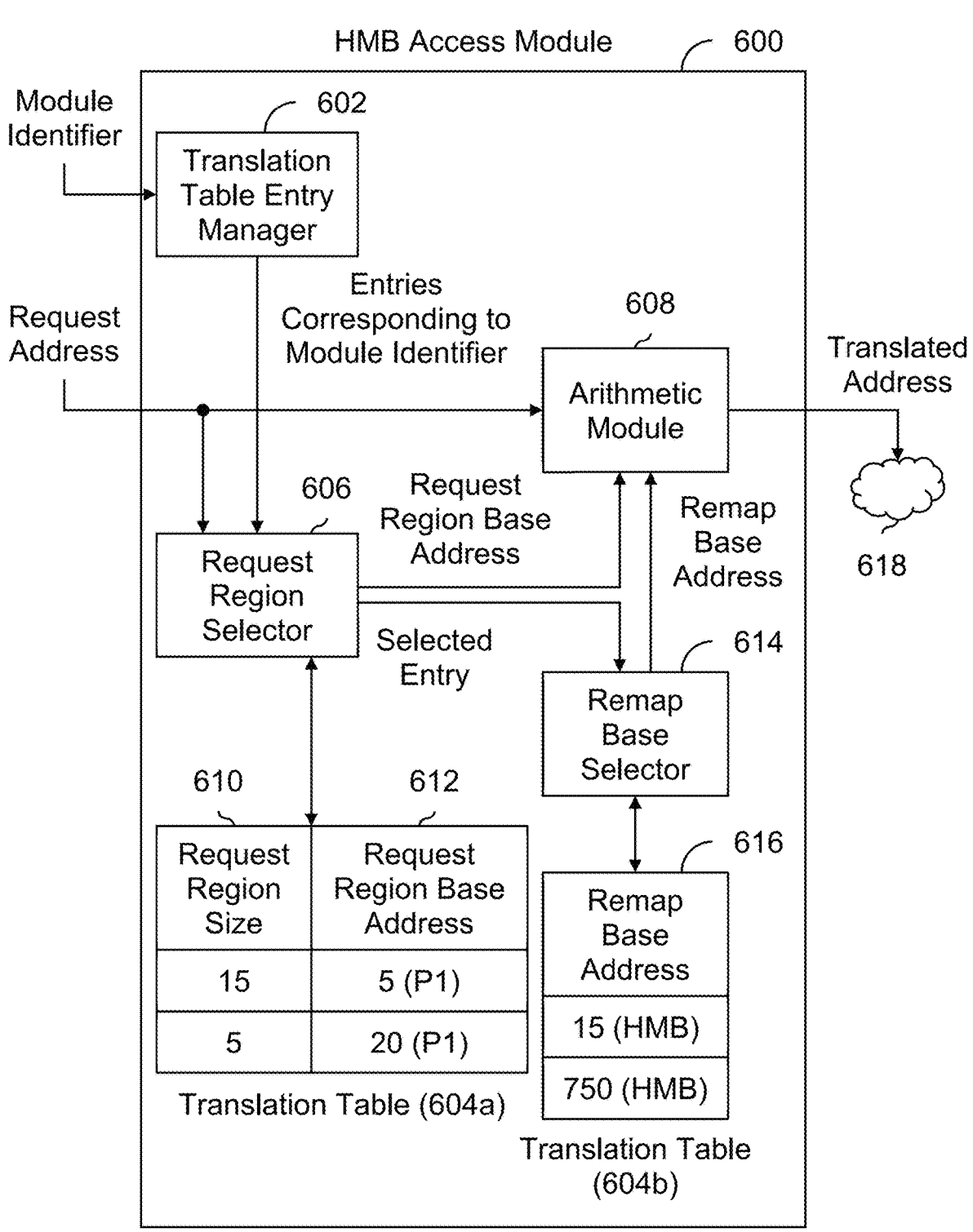
FIG. 6 is a diagram illustrating an embodiment of a host memory buffer (HMB) access module that uses a region base address and a remap base address to calculate a translated address.

FIG. 6 is a diagram illustrating an embodiment of a host memory buffer (HMB) access module that uses a region base address and a remap base address to calculate a translated address. In this example, the HMB access module (600) includes a translation table entry manager (602) which inputs the module identifier. The translation table entry manager (602) tracks which entries in the translation table (e.g., at least 604a) belong to which module identifier. The entries corresponding to the (e.g., received) module identifier are output by the translation table entry manager (602) and are passed to the request region selector (606).

The request region selector (606) is responsible for providing the request region base address to the arithmetic module (608). To do so, the request region selector (606) inputs the request address and the entries corresponding to the module identifier. The request region selector (606) then accesses those (e.g., enabled) entries in the translation table (604a) that are specified by the translation table entry manager (602) and compares the request address against the (e.g., enabled) request region sizes (610) and request region base addresses (612) to determine which request region the request address falls into. For example, if the request address is 19 (P1), then that request address falls into the request region with a request region base address (612) of 5 (P1) and a request region size (610) of 15. If the request address is 20 (P1), then that request address falls into the request region with a request region base address (612) of 20 (P1) and a request region size (610) of 5.

In addition to outputting the request region base address to the arithmetic module (608), the request region selector (606) also passes the selected entry (e.g., which row in the translation table (604a)) to the remap base selector (614). The remap base selector (614) uses the selected entry to access an associated entry in the translation table (604b) that stores the remap base address (616) that corresponds to the selected (e.g., request region entry) in the translation table (604a). For example, if the request address is 19 (P1), then a remap base address (616) of 15 (HMB) is selected and passed to the arithmetic module (608); if the request address is 20 (P1), then a remap base address (616) of 750 (HMB) is selected and passed to the arithmetic module (608).

The arithmetic module (608) inputs the request address, request region base address, and remap base address and performs the arithmetic function: translated address=requested address−request region base address+remap base address. The translated address is then output by the arithmetic module (608) to other logic (618), such as a host interface, which assembles a host request using the translated address. This additional logic (618) is not central to the techniques described herein and for brevity is not described herein. In some embodiments, existing message generation and/or host interface modules and/or logic may be (re) used to provide this functionality.

In some applications, it may (e.g., technically) be acceptable to have a request address map to multiple, identical translated addresses (i.e., the translation logic outputs multiple answers, where all of the answers are identical), but because of design verification rules (e.g., performed using SOC computer-aided design (CAD) tools during the SOC design process), this is undesirable. In this example, to make design verification run more smoothly (i.e., without triggering design verification errors or warnings associated with multiple solutions being valid answers or outputs), a single translated address is output by the arithmetic module (608) so that (only) a single answer is selected (e.g., based on some set of defined priorities and/or prioritization) to ensure that the translation resolves to a unique (and therefore consistent and/or repeatable) translated address. For example, the request region selector (606) and/or the remap base selector (614) may include an n-to-1 multiplexer that only outputs a single selection, even if multiple inputs to the multiplexer are (e.g., logically) viable and/or acceptable.

In some embodiments, if no solution is found (i.e., HMB access module (600) could not identify a translated address that corresponds to the request address and the module identifier), the translated address that is returned is the same address as the request address. This, for example, will signal that a translated address could not be found. In some such embodiments (i.e., when no translated address is identified), a host request (e.g., 412 in FIG. 4) is not sent to the host (e.g., 408 in FIG. 4) and an access response (e.g., 416 in FIG. 4), which includes the request address, is returned to the requesting processor or requesting module.

As is shown in this example, in some embodiments, the translated address (e.g., output by arithmetic module (608)) is calculated using a request region base address (e.g., output by request region selector (606)) that is associated with a contiguous apparent HMB memory space (e.g., 502 in FIG. 5) and a remap base address (e.g., output by remap base selector (614)) that is associated with one of the plurality of non-contiguous fragments (e.g., 512a or 512b in FIG. 5) in the host memory buffer (e.g., 510 in FIG. 5).

It is noted that in this example, the arithmetic calculation that is performed (i.e., Translated Address=Requested Address−Request Region Base Address+Remap Base Address) is such that all of the values stored in the translation table (604a and 604b) for the request region size (610), the request region base address (612), and the remap base address (616) are positive values. Storing only positive values (and no negative values) may be desirable because no bit needs to be allocated for the sign bit and the translation table (604a and 604b) can be utilized more efficiently.

As is shown in this example, in some embodiments, the at least one translation table (e.g., referred to in step 102 in FIG. 1) includes a plurality of request region base addresses (e.g., 612) that are all positive values, a plurality of request region sizes (e.g., 610) that are all positive values, and a plurality of remap base addresses (e.g., 616) that are all positive values.

As described above, in some embodiments, data that is stored in the host memory buffer is interleaved and error correction encoded, the latter of which creates associated parity information. The following figure shows an example of associated translation settings that may affect the translation processor and/or the host request that is sent to the host.

FIG. 7 is a diagram illustrating an embodiment of error correction encoded data in a host memory buffer and associated translation settings. In this example, all data that is stored on the host memory buffer (700) is interleaved and error correction encoded. In this example, the error correction code is a systematic code where the payload (e.g., Payload 1 (702a)) is included or otherwise copied in the encoded data that is stored in the host memory buffer (e.g., Payload 1 (702b) in the host memory buffer (700)).

In this example, the error correction code has a code rate of 7/8 so that 1 unit of parity information is generated for every 7 bits of payload information. Therefore, for the exemplary payloads (702a/b and 704a/b) which are 7 units long, parity information (706 and 708) with lengths of 1 unit are generated. The payloads (702a/b and 704a/b) and parity (706 and 708) in this example are associated with one of the processors in an SSD system, Processor 1 (not shown).

The storage of the parity (706 and 708) in the host memory buffer (700) affects the translated address that is generated by the HMB access module. For example, the translation settings (710) shown here have a value of FALSE for whether parity should be retrieved for Processor 1 (712). Therefore, if Processor 1 requests read access, the HMB access module (not shown) will need to generate translated address(es) and/or lengths that access Payload 1 (702b), skips Parity 1 (706), accesses Payload 2 (704b), skips Parity 2 (708), and so on. If error correction coding were not performed, then Processor 1's payloads would be packed in "tighter" in the host memory buffer, resulting in a "tighter" or smaller range of translated addresses within the host memory buffer.

Returning briefly to FIG. 4, in some embodiments, the translation settings (406) in FIG. 4 include some of the settings shown in translation settings (710) in FIG. 7. For example, the value of the code rate (714), which in this example is 7/8, may be used during calculation of a translated address (e.g., by "shifting" translated addresses to account for the extra space in the host memory buffer consumed by the parity information), or may affect the length or range of addresses specified by an access request.

In some embodiments, a module that stores information in a host memory buffer (such as Processor 1) has access to error correction decoding services and it is therefore useful for the requesting module (e.g., Processor 1) to receive the parity (e.g., in addition to the payload). For example, if the requesting module (e.g., Processor 1) previously requested just the payload but it was determined that the returned payload contained an error, then the "retrieve parity?" setting (712) may be changed from FALSE to TRUE and a read request may be performed again so that another read is performed, this time also returning the parity information. Alternatively, in some cases, a requesting module may not have access to error correction decoding services, and its "retrieve parity?" setting is kept at FALSE.

As shown in this example, in some embodiments, error correction encoded data (e.g., 702b, 706, 704b, and 708) is stored on a host memory buffer (e.g., 700) and determining the translated address is further based at least in part on a coding rate (e.g., 714) associated with the error correction encoded data.

As shown in this example, in some embodiments, an access request (e.g., referred to in step 100 in FIG. 1) includes a read request; error correction encoded data, including a payload portion (e.g., 702b and 704b) and a parity portion (e.g., 706 and 708), is stored on the host memory buffer (e.g., 700); and performing the access request includes determining, based at least in part on a setting (e.g., 712), whether to return: (1) only the payload portion or (2) the payload portion and the parity portion in response to the read request.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A solid-state drive (SSD) system, comprising:
a plurality of processors;
a host memory buffer (HMB) access module, wherein the HMB access module:
   receives a module identifier and a request address associated with an access request; and
   determines a translated address based at least in part on the module identifier and the request address, including by accessing at least one translation table that stores address mappings between (1) the plurality of processors in the SSD system and (2) a host memory buffer, wherein each processor in the plurality of processors has a non-overlapping memory space in the host memory buffer; and
a host interface, wherein the host interface performs the access request, including by accessing the host memory buffer using the translated address, wherein the host memory buffer is located in host memory that is external to the SSD system.

2. The SSD system recited in claim 1, wherein the plurality of processors includes a plurality of symmetric multiprocessing (SMP) processors that run identical firmware.

3. The SSD system recited in claim 1, wherein one or more logical-to-physical address mapping tables are stored in the host memory buffer.

4. The SSD system recited in claim 1, wherein:
the plurality of processors, the HMB access module, and the host interface are included in an SSD controller; and
the SSD controller is implemented in a System On Chip (SOC).

5. The SSD system recited in claim 4, wherein:
the SSD controller further includes a hardware functional module; and
the at least one translation table further stores address mappings between (1) the hardware functional module and (2) the host memory buffer.

6. The SSD system recited in claim 5, wherein the hardware functional module includes a direct memory access (DMA) module.

7. The SSD system recited in claim 1, wherein a contiguous apparent HMB memory space associated with a given one of the plurality of processors corresponds to a plurality of non-contiguous fragments in the host memory buffer.

8. The SSD system recited in claim 7, wherein the translated address is calculated using a request region base address that is associated with the contiguous apparent HMB memory space and a remap base address that is associated with one of the plurality of non-contiguous fragments in the host memory buffer.

9. The SSD system recited in claim 8, wherein the at least one translation table includes a plurality of request region base addresses that are all positive values, a plurality of request region sizes that are all positive values, and a plurality of remap base addresses that are all positive values.

10. The SSD system recited in claim 1, wherein error correction encoded data is stored on the host memory buffer and determining the translated address is further based at least in part on a coding rate associated with the error correction encoded data.

11. The SSD system recited in claim 1, wherein:
the access request includes a read request;
error correction encoded data, including a payload portion and a parity portion, is stored on the host memory buffer; and
performing the access request includes determining, based at least in part on a setting, whether to return: (1) only the payload portion or (2) the payload portion and the parity portion in response to the read request.

12. A method, comprising:
receiving, at a host memory buffer (HMB) access module in a solid-state drive (SSD) system, a module identifier and a request address associated with an access request;
determining, at the HMB access module, a translated address based at least in part on the module identifier and the request address, including by accessing at least one translation table that stores address mappings between (1) a plurality of processors in the SSD system and (2) a host memory buffer, wherein each processor in the plurality of processors has a non-overlapping memory space in the host memory buffer; and
performing, at a host interface, the access request, including by accessing the host memory buffer using the translated address, wherein the host memory buffer is located in host memory that is external to the SSD system.

13. The method recited in claim 12, wherein a contiguous apparent HMB memory space associated with a given one of the plurality of processors corresponds to a plurality of non-contiguous fragments in the host memory buffer.

14. The method recited in claim 12, wherein error correction encoded data is stored on the host memory buffer and determining the translated address is further based at least in part on a coding rate associated with the error correction encoded data.

15. The method recited in claim 12, wherein:
the access request includes a read request;
error correction encoded data, including a payload portion and a parity portion, is stored on the host memory buffer; and
performing the access request includes determining, based at least in part on a setting, whether to return: (1) only the payload portion or (2) the payload portion and the parity portion in response to the read request.

* * * * *